United States Patent
Rappitsch et al.

(10) Patent No.: US 10,520,116 B2
(45) Date of Patent: Dec. 31, 2019

(54) SHROUDED PIPE

(71) Applicant: AIRBUS OPERATIONS GMBH, Hamburg (DE)

(72) Inventors: Michael Rappitsch, Hamburg (DE); Konrad Rauch, Augsburg (DE); Dirk Schwarze, Augsburg (DE); Christoph Heimerdinger, Augsburg (DE); Daniel-Christian Cojocaru, Augsburg (DE)

(73) Assignee: Airbus Operations GmbH, Hamburg (DE)

( * ) Notice: Subject to any disclaimer, the term of this patent is extended or adjusted under 35 U.S.C. 154(b) by 39 days.

(21) Appl. No.: 15/600,122

(22) Filed: May 19, 2017

(65) Prior Publication Data
US 2017/0335997 A1 Nov. 23, 2017

(30) Foreign Application Priority Data
May 20, 2016 (EP) .................................... 16170735

(51) Int. Cl.
*F16L 9/18* (2006.01)
*F16L 9/19* (2006.01)
(Continued)

(52) U.S. Cl.
CPC .............. *F16L 9/19* (2013.01); *B64D 37/005* (2013.01); *F16L 9/18* (2013.01); *F16L 39/005* (2013.01); *F16L 2201/30* (2013.01)

(58) Field of Classification Search
CPC ........... F16L 9/18–20; F16L 9/22; F16L 11/20
(Continued)

(56) References Cited

U.S. PATENT DOCUMENTS

| 724,675 A | 4/1903 | Decker |
| 2,756,032 A * | 7/1956 | Dowell ............... F28D 21/0008 138/114 |

(Continued)

FOREIGN PATENT DOCUMENTS

| DE | 102005059089 A1 | 6/2007 |
| EP | 2589787 A1 | 5/2013 |

(Continued)

OTHER PUBLICATIONS

Extended European Search Report for Application No. 16170733 dated Nov. 7, 2016.
(Continued)

*Primary Examiner* — Patrick F Brinson
(74) *Attorney, Agent, or Firm* — Jenkins, Wilson, Taylor & Hunt, P.A.

(57) ABSTRACT

A method of manufacturing a shrouded pipe comprising an inner pipe section for providing a primary fluid path and an outer pipe section for enclosing the inner pipe section to provide a secondary fluid path. The method includes opening the outer pipe section by separating first and second longitudinal edges which split the outer pipe section along a longitudinal line, assembling the outer pipe section with the inner pipe section by passing the inner pipe section between the separated first and second longitudinal edges, and closing the outer pipe section by bringing the first and second longitudinal edges together and joining the first and second longitudinal edges together. An advantage of this method is that close manufacturing tolerances can be achieved without a complex or difficult assembly process.

20 Claims, 3 Drawing Sheets

(51) Int. Cl.
*B64D 37/00* (2006.01)
*F16L 39/00* (2006.01)

(58) Field of Classification Search
USPC .................. 138/112–114, 110; 285/123.15
See application file for complete search history.

(56) References Cited

U.S. PATENT DOCUMENTS

| | | | | |
|---|---|---|---|---|
| 5,497,809 | A * | 3/1996 | Wolf | F16L 39/005 |
| | | | | 138/113 |
| 6,880,581 | B1 * | 4/2005 | Weeks | B21C 37/10 |
| | | | | 138/156 |
| 7,451,541 | B2 * | 11/2008 | Stastny | F16L 9/17 |
| | | | | 138/157 |
| 8,267,433 | B2 | 9/2012 | Lange et al. | |
| 10,006,568 | B2 * | 6/2018 | Callaghan | F01D 25/00 |
| 2004/0026922 | A1 | 2/2004 | Carns et al. | |
| 2007/0012818 | A1 * | 1/2007 | Miyazawa | A63H 27/12 |
| | | | | 244/17.25 |
| 2010/0230953 | A1 | 9/2010 | Baylot et al. | |
| 2010/0282353 | A1 | 11/2010 | Baylot et al. | |
| 2013/0087238 | A1 * | 4/2013 | Mercier | F16L 3/26 |
| | | | | 138/118.1 |
| 2013/0312865 | A1 | 11/2013 | Baur et al. | |
| 2015/0369400 | A1 * | 12/2015 | Dill | F16L 9/20 |
| | | | | 138/147 |
| 2017/0336007 | A1 | 11/2017 | Rappitsch et al. | |

FOREIGN PATENT DOCUMENTS

| | | |
|---|---|---|
| EP | 2927471 A1 | 10/2015 |
| EP | 3246609 A1 | 11/2017 |
| FR | 2712065 A1 | 5/1995 |
| WO | WO 99/34141 A1 | 7/1999 |

OTHER PUBLICATIONS

Extended European Search Report for Application No. 16170735 dated Nov. 7, 2016.
European Office Action for Application No. 16170733.6 dated Mar. 15, 2019.
European Office Action for Application No. 16170733.6 dated Sep. 26, 2019.
Restriction Requirement for U.S. Appl. No. 15/600,146 dated October 11, 2019.

* cited by examiner

SHROUDED PIPE

CROSS-REFERENCE TO RELATED APPLICATION

This application claims priority to European patent application EP 16 170 735.1 filed May 20, 2016, the entire disclosure of which is incorporated by reference herein.

TECHNICAL FIELD

The present disclosure relates to a method of manufacturing a shrouded pipe, in particular a shrouded pipe for distributing fuel or other fluids within an aircraft.

BACKGROUND

It is sometimes necessary for aircraft fuel lines to be shrouded in order to ensure that a leak within the main fuel pipe is contained by the shrouding. Such shrouding is typically mandatory in areas of the aircraft specified by the relevant certifying authority as ignition control zones, for example pressurized areas of the aircraft occupied by crew, passengers or cargo through which fuel lines must pass. In addition, pipes within aircraft may be shrouded in order to provide two fluid flow paths: one within the inner pipe and another in the volume between the inner and outer pipes.

A known shrouded fuel line assembly is disclosed in US2004/0026922A1, which describes a support member engaged with ends of inner and outer conduits to prevent or reduce movement of the inner conduit within the outer conduit and to allow for the transfer of loads from the inner and/or outer conduits to one or more external components.

SUMMARY

A first aspect of the disclosure herein provides a method of manufacturing a shrouded pipe comprising an inner pipe section for providing a primary fluid path and an outer pipe section for enclosing the inner pipe section to provide a secondary fluid path, the method comprising: opening the outer pipe section by separating first and second longitudinal edges which split the outer pipe section along a longitudinal line; assembling the outer pipe section with the inner pipe section by passing the inner pipe section between the separated first and second longitudinal edges; and closing the outer pipe section by bringing the first and second longitudinal edges together and joining the first and second longitudinal edges together.

An advantage of the disclosure herein is that close manufacturing tolerances can be achieved without a complex or difficult assembly process. In the known arrangement disclosed in US2004/0026922 it is necessary to assemble the inner conduit with the outer conduit before joining these parts to the support member and end fittings. That is, it is necessary to weld the inner conduit to the support member and end fitting while the outer conduit is in situ, a process which is very difficult due to the lack of visibility of the joint. In contrast, the method of the present disclosure avoids this problem by enabling the outer pipe section to be assembled with the inner pipe section after the inner pipe section has been joined to another member, such as an end fitting or a connection fitting.

The shrouded pipe may be for transporting any fluid, including any liquid or any gas. The secondary fluid path may provide a conduit for fluid which has leaked from the primary fluid path. Alternatively, the primary fluid path and secondary fluid path may provide separate dedicated fluid flow paths. In some embodiments the primary fluid path may be for transporting a first fluid and the secondary fluid path may be for transporting a second liquid. In other embodiments the primary fluid path and secondary fluid path may provide fluid flows in opposite directions.

In preferred embodiments joining the first and second longitudinal edges together comprises forming a longitudinal weld seam between the first and second longitudinal edges. Welding provides a sealed joint with good mechanical properties.

Opening the outer pipe section preferably includes elastically deforming the outer pipe section to provide a generally C-shaped cross-section. The outer pipe section (and, optionally, inner pipe section) may be formed from a metal such as titanium or aluminum. Appropriate metals are typically capable of being deformed in the required manner without experiencing plastic deformation. They are also capable of being welded, resistant to corrosion caused by aviation fuel, and/or able to withstand the necessary mechanical loads with an acceptable fatigue life.

In some embodiments the shrouded pipe further includes an annular collar part for maintaining a given spacing between the inner and outer pipe sections, the method including: joining a first circumferential edge at a first end of the outer pipe section with a first outer circumferential portion of the collar part, optionally by forming a first circumferential weld seam.

The first outer circumferential portion of the collar part preferably comprises a circumferential recess in a radially outwardly-facing face of the first outer circumferential portion, whereby closing the outer pipe section includes seating the first circumferential edge of the outer pipe section in the circumferential recess, prior to joining the first circumferential edge with the first outer circumferential portion. By seating the first circumferential edge in the circumferential recess, the outer pipe section can be accurately located with respect to the inner pipe section. The assembly process can therefore be carried out to close dimensional tolerances.

Preferred embodiments of the method include the step of, before assembling the outer pipe section with the inner pipe section and before joining the first circumferential edge of the outer pipe section with the first outer circumferential portion, joining a first circumferential edge at a first end of the inner pipe section with a first inner circumferential portion of the collar part, optionally by forming a second circumferential weld seam. Thus, forming the join between the inner pipe section with the collar part can be carried out without the outer pipe section being in the way.

The annular collar part (connection fitting) is preferably for connecting a second outer pipe section to the outer pipe section, the method then including joining a second circumferential edge at an end of the second outer pipe section with a second outer circumferential portion of the collar part adjacent to the first outer circumferential portion. In this way, a long shrouded pipe can be assembled from two or more inner and outer pipe sections connected together by one or more collar parts.

A second aspect of the disclosure herein provides a kit of parts for manufacturing a shrouded pipe, including: an inner pipe section for providing a primary fluid path; and an outer pipe section for enclosing the inner pipe section to provide a secondary fluid path, the outer pipe section being split along a longitudinal line to provide first and second longitudinal edges, wherein the outer pipe section is elastically deformable to enable assembly with the inner pipe section by separating the first and second longitudinal edges and passing the inner pipe section between the first and second longitudinal edges.

A third aspect of the disclosure herein provides a shrouded pipe comprising: an inner pipe section for providing a primary fluid path; and an outer pipe section for enclosing the inner pipe section to provide a secondary fluid path, the outer pipe section comprising a longitudinal joint joining first and second longitudinal edges of the outer pipe section together. The longitudinal joint preferably comprises a longitudinal weld seam.

In some embodiments the shrouded pipe comprises an annular collar part joined to the inner and outer pipe sections to maintain a given spacing therebetween, the collar part having a circumferential recess in a radially outwardly-facing face in which a first circumferential edge of the outer pipe section is seated, and a circumferential joint joining the first circumferential edge to the collar part, the circumferential joint preferably comprising a circumferential weld seam.

A fourth aspect of the disclosure herein provides an aircraft fuel system comprising a shrouded fuel pipe according to the third aspect, or a shrouded fuel pipe manufactured according to the first aspect.

Any of the optional, or preferred, features or advantages described or claimed herein can be applied to any of the various aspects of the disclosure herein, either alone or in any combination.

BRIEF DESCRIPTION OF THE DRAWINGS

Embodiments of the disclosure herein will now be described with reference to the accompanying drawings, in which.

DETAILED DESCRIPTION

Figure 1:
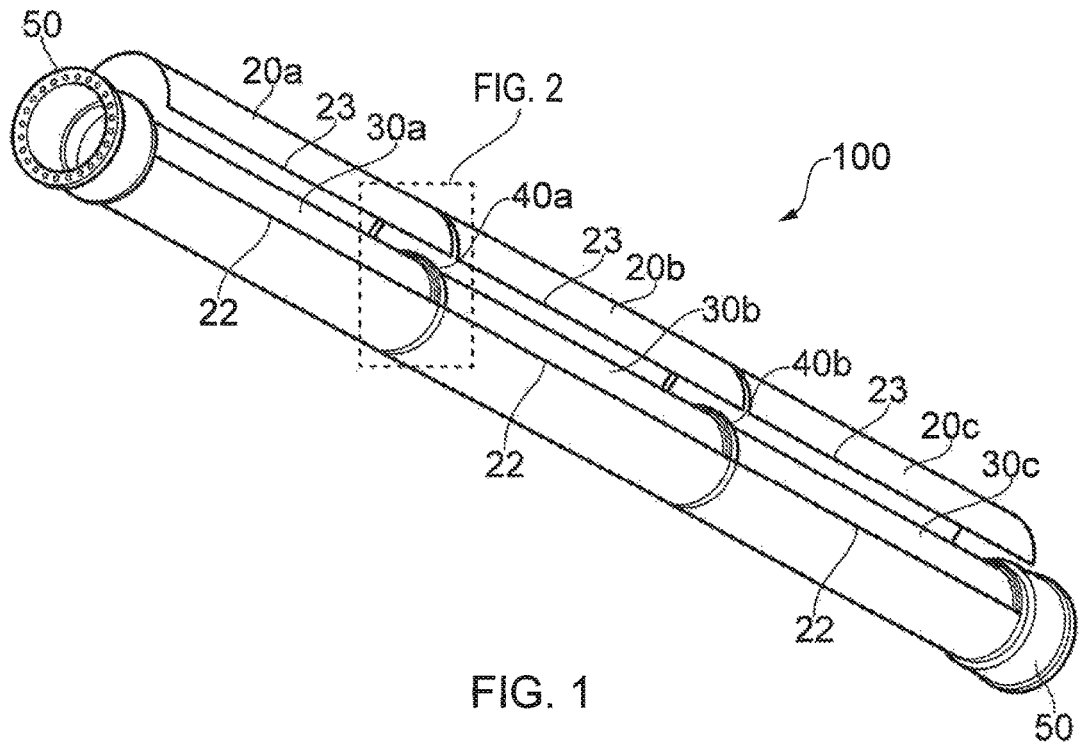
FIG. 1 shows an isometric view of a shrouded fuel pipe according to an embodiment of the disclosure herein during its manufacture.
Figure 2:
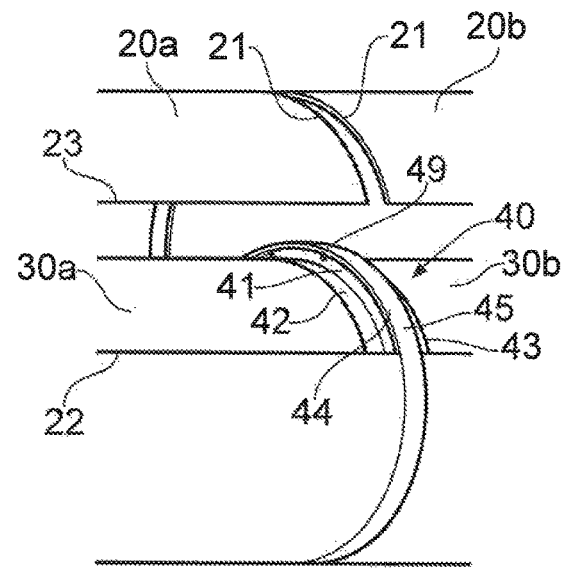
FIG. 2 shows a detail view of FIG. 1.
Figure 3:
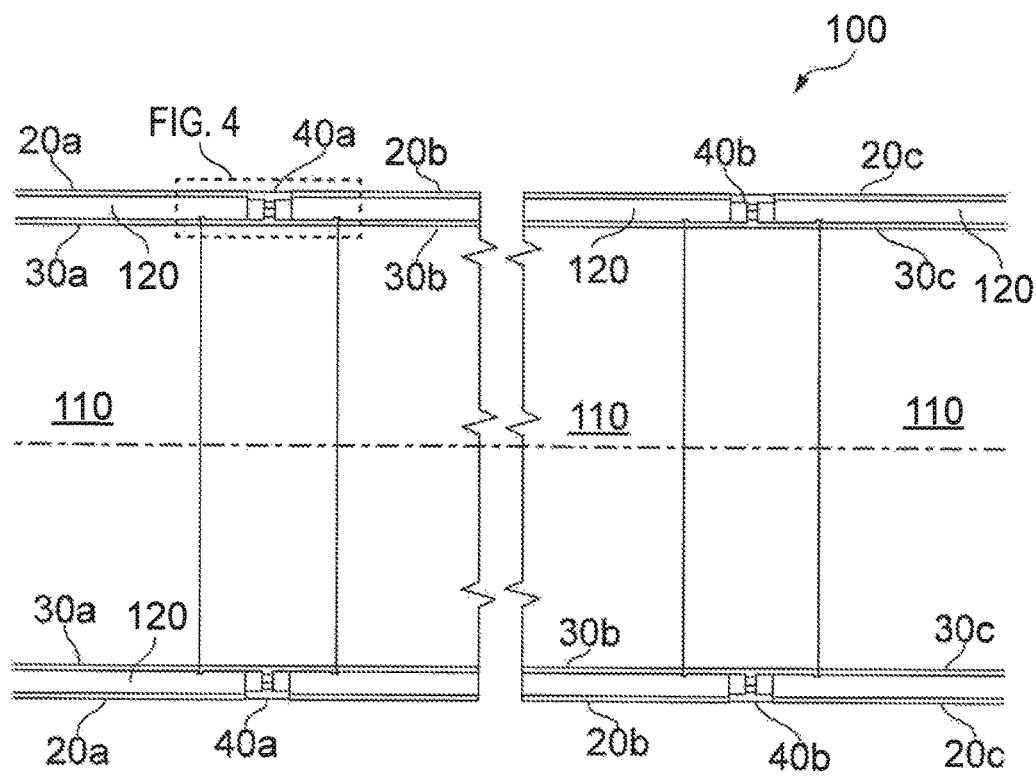
FIG. 3 shows a longitudinal cross-section of a shrouded fuel pipe according to an embodiment of the disclosure herein.
Figure 4:
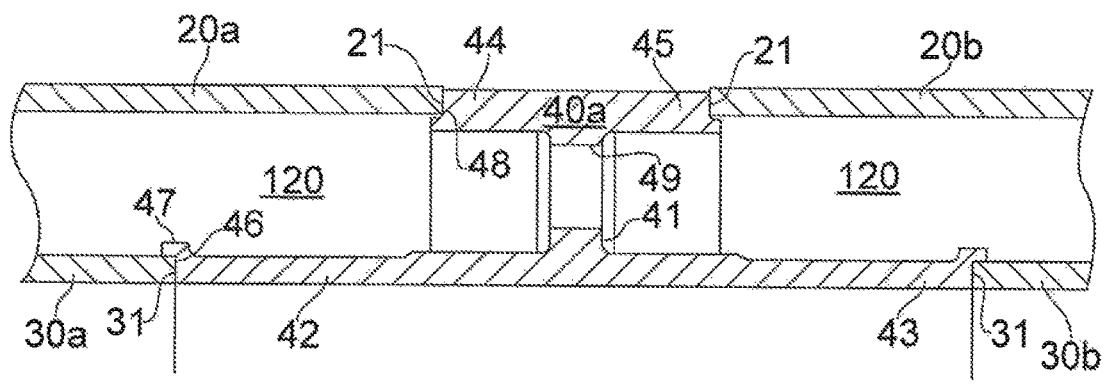
FIG. 4 shows a detail view of FIG. 3.
Figure 5:
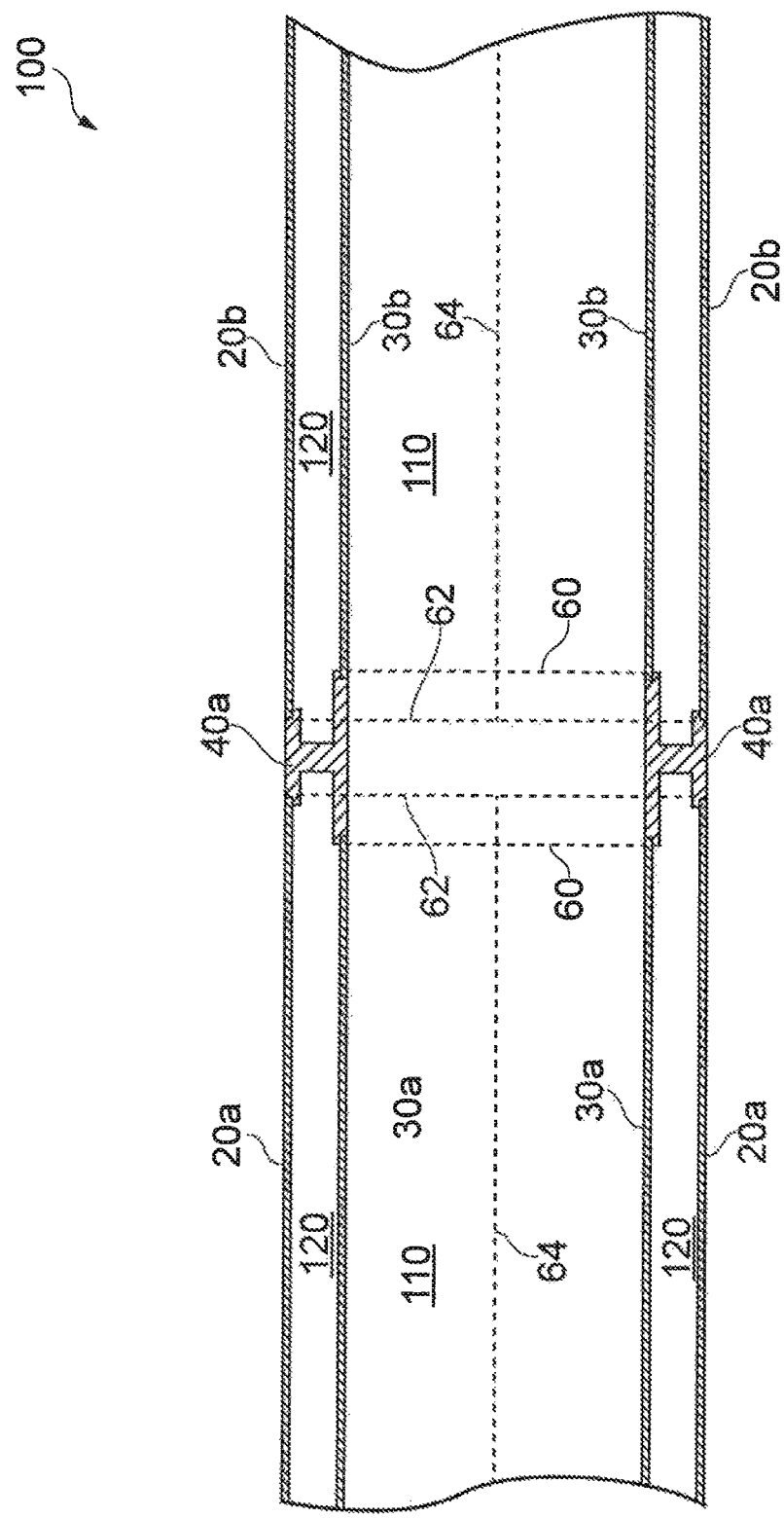
FIG. 5 is a schematic illustration of a shrouded fuel pipe according to an embodiment of the disclosure herein, showing the locations of weld seams.

FIGS. 1 through 5 illustrate embodiments of a shrouded fuel pipe 100 according to the disclosure herein, both part way through the manufacturing process (FIGS. 1 and 2) and after manufacture (FIGS. 3 to 5).

The completed shrouded fuel pipe 100 (FIGS. 3 to 5) comprises one or more outer pipe sections 20 (20a, 20b, 20c) which are each co-axial with an inner pipe section 30 (30a, 30b, 30c) that has a smaller diameter than the outer pipe section 20. Each pipe section comprising an outer pipe section 20 and inner pipe section 30 is connected to another pipe section by a connection fitting 40 to which the inner 30 and outer 20 pipe sections are joined. Thus, the shrouded fuel pipe 100 comprises a series of pipe sections connected together by connection fittings 40, with an end fitting 50 (which will not be described in detail herein) at each end. The inner pipe sections 30 together provide a primary fuel flow path 110, while the annular volume between the inner pipe sections 30 and the outer pipe sections 20 provides a secondary fuel flow path 120 for any fuel which has leaked from a damaged, or otherwise compromised, portion of the primary fuel flow path. Alternatively, the secondary fuel flow path 120 may be a dedicated flow path for fuel or any other fluid. For example, the secondary fuel flow path 120 may be used to provide fuel flow in the opposite direction to that of the primary fuel flow path 110, or may be used to provide a flow of a fluid other than fuel.

The inner 30 and outer 20 pipe sections, the connection fittings 40 and the end fittings 50 are each formed from titanium, or any other metal that is suitable for resisting corrosion caused by aviation fuel, can be welded, and is capable of withstanding the necessary mechanical loads and with a suitable fatigue life. The selected metal should also be capable of elastic deformation to the degree necessary to enable assembly of the inner 30 and outer 20 pipe sections, as discussed below. Other suitable metals are aluminum, steel or stainless steel, for example.

Each connection fitting 40 is a generally annular member which has a generally "I" shaped cross section. That is, the connection fitting 40 comprises a ring-shaped web 41, from an inner circumferential edge of which first 42 and second 43 inner flanges extend in respective opposite axial directions. First 44 and second 45 outer flanges extend in respective opposite axial directions from an outer circumferential edge of the web 41. The first 44 and second 45 outer flanges are for joining the outer pipe section 20 to the connection fitting 40, while the first 42 and second 43 inner flanges are for joining the inner pipe section 30 to the connection fitting 40. The first 42 and second 43 inner flanges are longer (i.e. extend further in their respective axial directions from the web 41) than the first 44 and second 45 outer flanges.

A plurality of apertures 49 extend through the web 41 of the connection fitting 40, and are distributed evenly around the web 41. The apertures 49 enable leaked fuel flowing through the secondary fuel flow path 120 to travel across the connection fittings 40 if necessary, e.g. if the secondary fuel flow path 120 for one of the pipe sections becomes filled with fuel so that overspill to the secondary fuel flow path of neighboring pipe section.

Each inner flange 42, 43 of the connection fitting 40 has a circumferential welding notch 46 that comprises a recess around the circumference of the inner face of the inner flange 42, 43 into which a circumferential end edge 31 of the respective inner pipe section 30 is seated. The welding notch 46 thus forms a socket into which the circumferential end edge 31 is fitted. The circumferential end edge 31 is then joined to the inner flange 42, 43 via an inner pipe circumferential weld seam 60 which provides a sealed connection between the inner pipe section 30 and the connection fitting 40. The inner pipe circumferential weld seam 60 is created at the outwardly facing surface of the joint between the inner flange 42, 43 and the inner pipe section 30, rather than at the inwardly-facing surface. This arrangement ensures a much easier welding process, since access and visibility is very good (as discussed further below).

In the embodiment of FIGS. 3 and 4 the welding notch 46 is formed by a grow-out portion 47 which extends both radially outwardly and longitudinally outwardly (away from the web 41) from the free end of each inner flange 42, 43. The grow-out portion 47 provides filler material for the inner pipe circumferential weld seam 60. In the embodiment of FIG. 5 the welding notch 46 is instead formed merely as a notch or recess in the inner flange, and filler material for the weld seam 60 is provided separately. In other embodiments there may be no welding notch 46, and the circumferential end edge 31 of each inner pipe section 30 may be joined to the respective inner flange 42, 43 via a butt joint, lap joint, or other suitable joint. In yet further embodiments the inner pipe section 30 may be joined to the connection fitting 40 via a joining process other than welding, such as by bonding, fastening, compression fitting or any other suitable joining method.

Each outer flange 44, 45 of the connection fitting 40 also has a circumferential welding notch 48 which, in contrast to the notch of the inner flanges, comprises a recess around the circumference of the outer face of the outer flange into which a circumferential end edge 21 of the outer pipe section 20 is seated. The circumferential end edge 21 is then joined to the outer flange 44, 45 via an outer pipe circumferential weld seam 62 which provides a sealed connection between the outer pipe section 20 and the connection fitting 40. The outer pipe circumferential weld seam 62 is created at the outwardly-facing surface of the joint between the outer flange 44, 45 and the outer pipe section 20, rather than at the inwardly-facing surface. This arrangement ensures a much easier welding process, since access and visibility is very good (as discussed further below).

In the illustrated embodiments the welding notch 48 is formed as a cut-away portion of the outer flange 44, 45, but in other embodiments it may be formed by a grow-out portion in a similar fashion to the inner flanges 42, 43. In other embodiments the welding notch 48 may be omitted, and the circumferential end edge 21 of each outer pipe section 20 may be joined to the respective outer flange 44, 45 via a butt joint, lap joint or other suitable joint.

The connection fitting 40 thus serves both to maintain a given radial spacing between the inner 30 and outer 20 pipe sections, and to connect neighboring pipe sections.

Each outer pipe section 20 comprises first 22 and second 23 longitudinal edges that extend the full axial length of the outer pipe section 20 and are joined together by a longitudinal weld seam 64 following assembly with the inner pipe section 30, as described below.

The weld seams 60, 62, 64 are formed by any suitable welding process, such as laser beam welding or TIG (tungsten-inert-gas) welding.

To manufacture each pipe section of the shrouded fuel pipe 100, the inner pipe section 30a is first assembled with the connection fitting 40a by seating the circumferential end edge 31 within the welding notch 46 of the inner flange 42. The inner pipe section 30a may also be connected at its other end to an end fitting 50. The inner pipe section 30a and connection fitting 40a are then joined together via a circumferential weld seam 60 at the interface between the circumferential end edge 31 and the welding notch 46. The inner pipe circumferential weld seam 60 thus seals the primary fuel flow path 110 at the interface between the inner pipe section 30a and the connection fitting 40a. The fact that the inner flange 42 is longer than the outer flange 44 ensures that the person performing the welding step has easy access to, and full visibility of, the joint as the weld seam 60 is created.

To assemble the outer pipe section 20a with the inner pipe section 30a and the connection fitting 40a, the first 22 and second 23 longitudinal edges of the outer pipe section 20a are separated away from one another to create a longitudinal gap therebetween, as shown in FIGS. 1 and 2. During this process the outer pipe section 20a elastically deforms so that it temporarily adopts a generally C-shaped cross section. The outer pipe section 20a is elastically deformed such that there is no, or substantially no, plastic deformation of the metal (or other material) of the part. The inner pipe section 30a (which is pre-assembled with the connection fitting 40a, and optionally with the end fitting 50) is then inserted through the longitudinal gap into the outer pipe section 20a.

The outer pipe section 20 may be provided with the first 22 and second 23 longitudinal edges pre-formed, or alternatively the first 22 and second 23 longitudinal edges may be formed at the point of manufacture.

Once the inner pipe section 30a has been inserted within the outer pipe section 20a, the first 22 and second 23 longitudinal edges are drawn together to close the longitudinal gap and the circumferential end edge 21 is seated in the welding notch 48 of the outer flange 44 of the connection fitting 40a. The outer pipe section 20a is then joined to the connection fitting 40a by forming the outer pipe circumferential weld seam 62 at the interface between the circumferential end edge 21 and the welding notch 48. If the inner pipe section 30a is assembled with an end fitting 50, the outer pipe section 20a is also joined to the end fitting 50. Finally, the longitudinal weld seam 64 is formed between the first 22 and second 23 longitudinal edges. In this way, the outer pipe circumferential weld seam 62 and longitudinal weld seam 64 together seal the secondary fuel flow path 120.

To form longer sections of shrouded fuel pipe, the second inner pipe section 30b is joined to the first connection portion 40a via an identical process to that described above in respect of the first inner pipe section 30a. Similarly, the second outer pipe section 20b is assembled with the second inner pipe section 30b and with the first connection fitting 40a via an identical process to that described above in relation to the first outer pipe section 20a. This process is continued for the third (and subsequent) inner 30c and outer 20c pipe sections and second (and subsequent) connection fitting 40b, until the desired length of shrouded fuel pipe has been achieved.

A particular advantage of the above-described design and method of manufacture is that close tolerances can be achieved, without a complex assembly process. In the known arrangement disclosed in US2004/0026922 it is necessary to weld the inner conduit to the support member and end fitting while the outer conduit is in situ. This process is extremely difficult due to the lack of visibility of the joint, which is almost entirely shrouded by the outer conduit. In contrast, the shrouded fuel pipe of the present disclosure, and the associated method of manufacture, avoids this problem by enabling the inner pipe section to be joined to the connection fitting(s) (and/or end fitting) before assembly with the outer pipe section. The improved visibility ensures improved accuracy and quality of the weld seam.

In a variation to the above method of manufacture, the outer pipe section 20a may be split longitudinally so that it is in two halves, the first 22 and second 23 longitudinal edges of the outer pipe section 20a being separated away from one another to create the longitudinal gap by separation of the two halves. The two halves of the outer pipe section 20a may then be joined together by two longitudinal weld seams, or two other suitable longitudinal joints.

Although the illustrated embodiments show a straight section of shrouded pipe 100, the disclosure herein may also be applied to bent, curved or otherwise non-straight sections of shrouded pipe.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of manufacturing a shrouded pipe comprising an inner pipe section for providing a primary fluid path and an outer pipe section for enclosing the inner pipe section to provide a secondary fluid path, the method comprising:
   opening the outer pipe section to define a gap by separating first and second longitudinal edges, which split the outer pipe section along a longitudinal line;
   assembling the outer pipe section with the inner pipe section by passing the inner pipe section through the gap when the first and second longitudinal edges are separated;
   closing the outer pipe section by bringing the first and second longitudinal edges together to close the gap;
   joining the first and second longitudinal edges together; and
   joining a first circumferential edge at a first end of the outer pipe section with a first outer circumferential portion of an annular collar part of the shrouded pipe to maintain a given spacing between the inner and outer pipe sections;
   wherein the outer pipe section is, prior to and during insertion of the inner pipe section within the outer pipe section, circumferentially continuous from the first longitudinal edge to the second longitudinal edge.

2. The method according to claim 1, wherein joining the first and second longitudinal edges together comprises forming a longitudinal weld seam between the first and second longitudinal edges.

3. The method according to claim 1, wherein opening the outer pipe section comprises elastically deforming the outer pipe section to provide a generally C-shaped cross-section.

4. The method according to claim 1, wherein joining the first circumferential edge of the outer pipe section with the first outer circumferential portion comprises forming a first circumferential weld seam.

5. The method according to claim 1, wherein the first outer circumferential portion of the collar part comprises a circumferential recess in a radially outwardly-facing face of the first outer circumferential portion, and wherein closing the outer pipe section comprises seating the first circumferential edge of the outer pipe section in the circumferential recess prior to joining the first circumferential edge with the first outer circumferential portion.

6. The method according to claim 1, comprising, before assembling the outer pipe section with the inner pipe section and before joining the first circumferential edge of the outer pipe section with the first outer circumferential portion, joining a first circumferential edge at a first end of the inner pipe section with a first inner circumferential portion of the collar part.

7. The method according to claim 6, wherein joining the first circumferential edge of the inner pipe section with the first inner circumferential portion of the collar part comprises forming a second circumferential weld seam.

8. The method according to claim 1, comprising joining a second circumferential edge at an end of a second outer pipe section with a second outer circumferential portion of the collar part adjacent to the first outer circumferential portion to connect the second outer pipe section to the outer pipe section.

9. A kit of parts for manufacturing a shrouded pipe, the kit of parts comprising:
   an inner pipe section configured to provide a primary fluid path;
   an outer pipe section for enclosing the inner pipe section to provide a secondary fluid path, the outer pipe section being split along a longitudinal line to provide first and second longitudinal edges; and
   an annular collar part comprising a first outer circumferential portion configured for joining, at a first end of the outer pipe section, with a first circumferential edge of the outer pipe section to maintain a given spacing between the inner and outer pipe sections,
   wherein the outer pipe section is elastically deformable to enable assembly with the inner pipe section by separating the first and second longitudinal edges to define a gap therebetween and passing the inner pipe section through the gap when the first and second longitudinal edges are separated, and
   wherein the outer pipe section is, prior to and during insertion of the inner pipe section within the outer pipe section, circumferentially continuous from the first longitudinal edge to the second longitudinal edge.

10. A shrouded pipe comprising:
    an inner pipe section configured to provide a primary fluid path;
    an outer pipe section that encloses the inner pipe section to provide a secondary fluid path, the outer pipe section comprising a longitudinal joint that joins first and second longitudinal edges of the outer pipe section together; and
    an annular collar part comprising a first outer circumferential portion that is configured for joining, at a first end of the outer pipe section, with a first circumferential edge of the outer pipe section to maintain a given spacing between the inner and outer pipe sections
    wherein the outer pipe section is elastically deformable to enable assembly with the inner pipe section by separating the first and second longitudinal edges to define a gap therebetween and passing the inner pipe section through the gap when the first and second longitudinal edges are separated, and
    wherein the outer pipe section is, prior to and during insertion of the inner pipe section within the outer pipe section, circumferentially continuous from the first longitudinal edge to the second longitudinal edge.

11. The shrouded pipe according to claim 10, wherein the longitudinal joint comprises a longitudinal weld seam.

12. The shrouded pipe according to claim 10, comprising an annular collar part joined to the inner and outer pipe sections to maintain a given spacing therebetween, the collar part having a circumferential recess in a radially outwardly oriented face, in which a first circumferential edge of the outer pipe section is seated, and a circumferential joint joining the first circumferential edge to the collar part.

13. The shrouded pipe according to claim 12, wherein the circumferential joint comprises a circumferential weld seam.

14. An aircraft fuel system comprising a shrouded pipe according to claim 10.

15. The method according to claim 1, wherein the outer pipe section comprises a unitary construction, such that, prior to insertion of the inner pipe section within the outer pipe section, the first and second longitudinal edges are opposing edges of a single piece of the outer pipe section and are adjacent to each other when the outer pipe section is in an undeformed state.

16. The kit of parts according to claim 9, wherein the outer pipe section is configured to be opened by elastically deforming the outer pipe section to provide a generally C-shaped cross-section.

17. The shrouded pipe according to claim 10, wherein the outer pipe section is configured to be opened by elastically deforming the outer pipe section to provide a generally C-shaped cross-section.

18. The kit of parts according to claim 9, wherein the first outer circumferential portion of the collar part comprises a circumferential recess in a radially outwardly-facing face of the first outer circumferential portion, and wherein the first circumferential edge of the outer pipe section is configured to be seated in the circumferential recess, prior to the first circumferential edge being joined with the first outer circumferential portion, to close the outer pipe section.

19. The kit of parts according to claim 9, wherein, before the outer pipe section is assembled with the inner pipe section and before the first circumferential edge of the outer pipe section is joined with the first outer circumferential portion, a first circumferential edge of the inner pipe section, at a first end of the inner pipe section, is configured for joining with a first inner circumferential portion of the collar part.

20. The shrouded pipe according to claim 10, wherein the first outer circumferential portion of the collar part comprises a circumferential recess in a radially outwardly-facing face of the first outer circumferential portion, and wherein the first circumferential edge of the outer pipe section is configured to be seated in the circumferential recess, prior to the first circumferential edge being joined with the first outer circumferential portion, to close the outer pipe section.

* * * * *